US008888590B2

(12) United States Patent
Kruglick

(10) Patent No.: US 8,888,590 B2
(45) Date of Patent: Nov. 18, 2014

(54) GRAPHICS RENDER MATCHING FOR DISPLAYS

(75) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 101 days.

(21) Appl. No.: 13/521,435

(22) PCT Filed: Dec. 13, 2011

(86) PCT No.: PCT/US2011/064666
§ 371 (c)(1),
(2), (4) Date: Jul. 10, 2012

(87) PCT Pub. No.: WO2013/089684
PCT Pub. Date: Jun. 20, 2013

(65) Prior Publication Data
US 2013/0150161 A1    Jun. 13, 2013

(51) Int. Cl.
*A63F 13/12* (2006.01)
(52) U.S. Cl.
USPC ............................................. 463/31; 463/34
(58) Field of Classification Search
CPC ......... A63F 13/02; A63F 13/10; A63F 13/12; A63F 2300/66; A63F 2300/6661; A63F 2300/64; A63F 2300/63; A63F 2300/632; A63F 2300/5533; A63F 2300/50; A63F 2300/51; A63F 2300/40
USPC .................. 463/29, 30, 31, 40, 41, 42, 43, 34
See application file for complete search history.

(56) References Cited

U.S. PATENT DOCUMENTS

| 6,980,599 | B2 * | 12/2005 | Zhong et al. | 375/240.29 |
| 6,985,528 | B2 | 1/2006 | Shin et al. | |
| 7,453,939 | B2 * | 11/2008 | Pan et al. | 375/240.08 |
| 7,796,095 | B2 | 9/2010 | Glen | |
| 8,773,448 | B2 * | 7/2014 | LaLonde et al. | 345/506 |

(Continued)

OTHER PUBLICATIONS

Michael Arrington, "Unity Technologies Takes $12 Million for 3D Gaming Development, Looks to China for Big Growth", TechCrunch, Jul. 20, 2011, 3 pages, Static webpage, http://techcrunch.com/2011/07/20/unity-technologies-takes-12-million-for-3d-gaming-development-looks-to-china-for-big-growth.

(Continued)

*Primary Examiner* — David L Lewis
*Assistant Examiner* — Matthew D Hoel
(74) *Attorney, Agent, or Firm* — Turk IP Law, LLC

(57) ABSTRACT

Technologies are presented for matching pre-processing of graphics at rendering source to post-processing at a display device to reduce undesirable effects of pre- and post-processing combinations. A rendering source may receive information associated with or otherwise determine a type of display device to which images are to be delivered. Parameters of the rendering process may then be suitably modified to take advantage of the post-processing performed by the display device or eliminate processes that may be undone by the display device. In some examples, the rendering source may communicate its pre-processing parameters to the display device and cause adjustment of post-processing parameters at the display device or, alternatively, send instructions to the display device to adjust the post-processing parameters.

20 Claims, 7 Drawing Sheets

(56) References Cited

U.S. PATENT DOCUMENTS

| | | | | |
|---|---|---|---|---|
| 2003/0223501 A1* | 12/2003 | Zhong et al. | ............. | 375/240.29 |
| 2007/0217505 A1* | 9/2007 | Lipka | ....................... | 375/240.02 |
| 2010/0265334 A1* | 10/2010 | Bhaskaran et al. | ........... | 348/180 |
| 2010/0306813 A1* | 12/2010 | Perry et al. | .................... | 725/114 |
| 2010/0322527 A1* | 12/2010 | Fablet et al. | .................. | 382/232 |
| 2012/0053464 A1* | 3/2012 | Murashita | .................... | 600/443 |
| 2012/0270652 A1* | 10/2012 | Kim et al. | ....................... | 463/32 |
| 2013/0235035 A1* | 9/2013 | Nara et al. | .................... | 345/419 |

OTHER PUBLICATIONS

"Unsharp Masking", Wikipedia, Accessed Nov. 28, 2011, http://en.wikipedia.org/wiki/Unsharp_mask.

International Search Report PCT/US12/64666 Filed Dec. 13, 2011, mailed Apr. 10, 2012.

International Preliminary Report on Patentability for PCT/US2011/064666 filed Dec. 13, 2011, mailed on Jun. 26, 2014, issued Jun. 17, 2014.

* cited by examiner

GRAPHICS RENDER MATCHING FOR DISPLAYS

BACKGROUND

Unless otherwise indicated herein, the materials described in this section are not prior art to the claims in this application and are not admitted to be prior art by inclusion in this section.

With the advance of networking and data processing technologies, online games are an increasingly widespread phenomenon. Online (as well as locally installed) games are ever more complex in image quality. Indeed, the line between digitally generated game renderings and captured video is constantly blurring. To take advantage of high quality image games, players often use television sets as display devices. Because television sets are primarily geared to displaying broadcast (wirelessly or through cable) video images, they tend to have circuitry for improving received signals.

Modern televisions have significant in-set image processing that they apply in an attempt to improve image quality. For example, some television sets attempt to reduce blur and improve motion smoothness due to the television refreshing at a higher frequency than a typical refresh rate for a standard TV signal. In-set signal processing may impact a number of display characteristics such as improve perceived motion smoothness or decrease a quality provided by anti-aliasing in the original signal, which presents a different set of optimal game rendering conditions than unprocessed video. Some systems with frame-to-frame background sharpening also reduce the amount of detail needed in each frame for the background in order to present the user with the same image.

Thus, in-set mechanisms for enhancing displayed image quality in television sets may work against pre-processed images in video games, either reducing effects of pre-processing or causing over-correction of images resulting in "fake" appearance of the game images.

SUMMARY

The present disclosure generally describes technologies for graphics render matching for displays to reduce an impact of display post-processing on delivered images such as video game images.

According to some examples, a method for providing graphics render matching for displays may include detecting one or more post-processing parameters of a display device, modifying a rendering process at a server based on the detected post-processing parameters, transmitting one or more images generated by the modified rendering process to the display device, and enabling display of the transmitted one or more images at the display device such that an impact of post-processing at the display device resulting in decreased image quality is substantially reduced.

According to other examples, a server adapted to match graphics rendering for displays may include a memory adapted to store instructions, a communication module, and a processing unit for communication with game client devices via one or more networks in conjunction with the stored instructions. The processing unit may detect one or more post-processing parameters of a display device, modify a rendering process based on the detected post-processing parameters to eliminate one or more rendering process steps that will be reversed by post-processing at the display device, transmit one or more images generated by the modified rendering process to the display device, and enable display of the transmitted one or more images at the display device.

According to further examples, a computer-readable medium may include instructions stored thereon for providing graphics render matching to display post-processing. The instructions may include detecting one or more post-processing parameters of a display device, modifying a rendering process at a game server based on the detected post-processing parameters, transmitting one or more images generated by the modified rendering process to the display device, and enabling display of the transmitted one or more images at the display device such that an impact of post-processing at the display device resulting in decreased image quality is substantially reduced.

According to yet other examples, a game client adapted to accept graphics render matching to display post-processing may include a display device, a memory adapted to store instructions, a communication module, and a processor coupled to the memory, the communication module, and the display device. The processor may determine one or more post-processing parameters of the display device, provide the one or more post-processing parameters to a game server such that a rendering process at the game server is modified based on the determined post-processing parameters, receive one or more images generated by the modified rendering process from the game server, and enable display of the received one or more images at the display device such that an impact of post-processing at the display device resulting in decreased image quality is substantially reduced.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
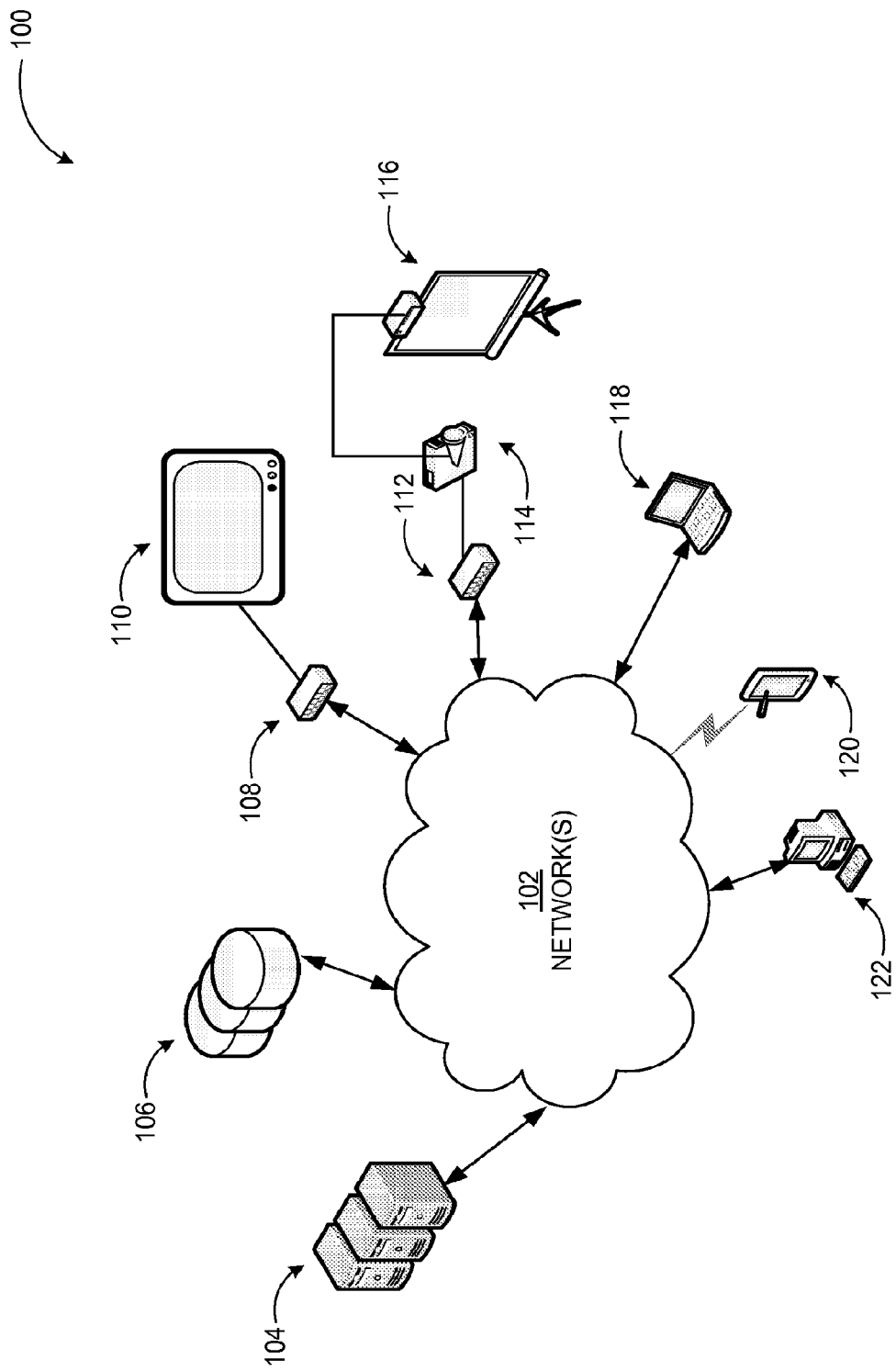
FIG. 1 illustrates an example networked system of service providers and rendering client devices, where graphics render matching for displays may be provided.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to graphics render matching for displays.

Briefly stated, technologies are presented for matching pre-processing of graphics at a rendering source to post-processing at a display device to reduce undesirable effects of pre- and post-processing combinations. A rendering source may receive information associated with or otherwise determine a type of display device to which images are to be delivered. Parameters of the rendering process may then be suitably modified to take advantage of the post-processing performed by the display device or eliminate processes that may be undone by the display device. In some examples, the rendering source may communicate its pre-processing parameters to the display device and cause the display device to turn off its post-processing or, alternatively, send instructions to the display device to adjust the post-processing parameters.

As used herein, the term "pre-processing" refers to various methods of image and video processing related to composition, rendering, enhancement, compression, and comparable characteristics of an image or a video stream at a source prior to the image or video stream being transmitted to one or more client devices for display. The term "post-processing" refers to various methods of image and video processing related to enhancement, decompression, motion fill, and comparable characteristics of an image or a video stream at a receiving device such as a television set upon receiving the image or video stream prior to displaying.

FIG. 1 illustrates an example networked system of service providers and rendering client devices, where graphics render matching for displays may be provided, arranged in accordance with at least some embodiments described herein.

While examples are described using online game applications and service providers herein, embodiments are not limited to rendering of online game images with post-processing matching. Example embodiments may be implemented in game applications, tele-chat applications, tele-shopping applications, or comparable ones. Similarly, a service provider as described below may provide online game services, communication services (e.g., video conferences), shopping services, and similar ones. Online games are an increasingly popular industry offering a wide range of game types to large audiences. Ranging from subscription based individual games to Massively Multi-player Online Games (MMOGs), cloud based games can be played on client devices ranging from smartphones to television sets. The visual characteristics of online games can also vary from basic graphics to very realistic real-life like video. Especially in case of more complicated video streams, substantial pre-processing may be involved at the source (game content generator or service provider distributing the game). Such pre-processing typically assumes a computing device at the receiving end and pre-processing of transmitted images takes into account potential network conditions, computing device display characteristics, etc.

Players are increasingly using large screen television sets, however. Televisions sets are, on the other hand, designed for displaying video signals from broadcast or similar sources. Many modern television sets include a variety of post-processing capabilities to enhance received video signals. The source pre-processing and television post-processing in a system employing television sets for displaying online video games may sometimes conflict, however. For example, some television sets may attempt to reduce blur and improve motion smoothness due to the television refreshing at a higher frequency than a typical refresh rate for a standard TV signal. Video game images aiming at providing realistic images may employ intentional blurring, for example, to avoid sharp edges in the rendered image, which may be perceived as "fakeness" by a viewer. When a television set removes blurring, the displayed video may appear with artifacts that are perceived as fake.

A system according to some embodiments may enhance computer generated images/video displayed on a television set by matching source pre-processing with detected television post-processing. Post-processing parameters of the display device—television or comparable device—may be determined by querying the display device or looking up a table of device characteristics and then adjusting pre-processing operations suitably. For example, some pre-processing steps may be removed or additional pre-processing steps may be added to compensate for the expected post-processing by the display device. According to other embodiments, the rendering source or the service provider may also send instructions to a smart display device and cause one or more post-processing parameters to be modified.

As shown in a diagram 100 in FIG. 1, an example cloud based game system may include one or more servers 104 rendering images or video streams and transmitting them to client devices over one or more networks 102. Data stores 106 may be used to store data associated with the provided images or video streams. The client devices may include computing devices such as a desktop computer 122, a handheld computer 120, a laptop computer 118, or similar devices such as a smartphone, a tablet computer, a vehicle mount computer, and so on. Client devices may also include controllers 108 or 112, which may enable a user to view the images or video streams through a display device such as a television set 110 or a projector 114-screen 116 combination. According to some examples, the display devices such as the television set 110 or the projector 114-screen 116 combination may be used through a computing device as well.

Figure 2:
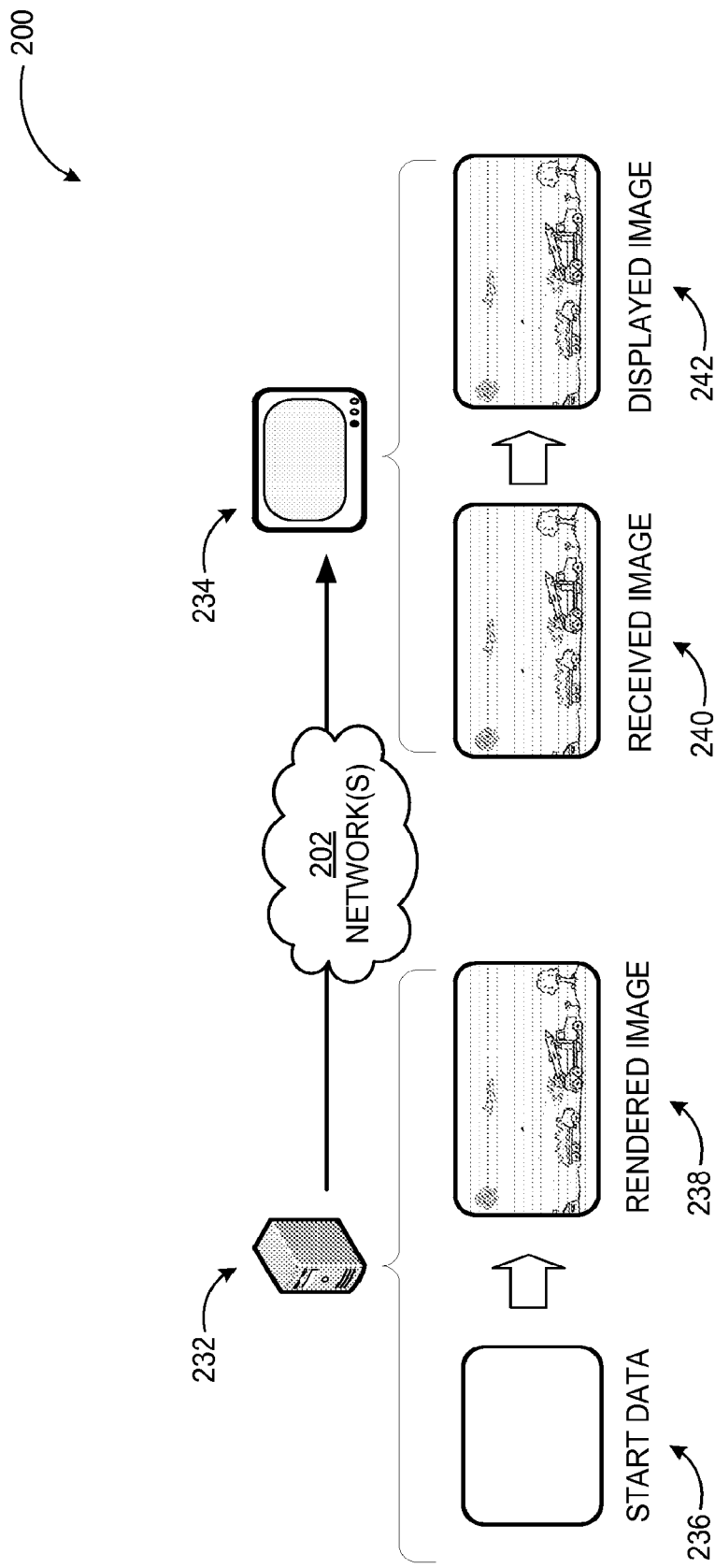
FIG. 2 illustrates conceptually a flow of image processing from a renderer to the display device with graphics render matching for displays.

FIG. 2 illustrates conceptually a flow of image processing from a renderer to the display device with graphics render matching for displays, arranged in accordance with at least some embodiments described herein.

A simple, example scenario is illustrated in a diagram 200 of FIG. 2, where an image (or video stream) 238 is rendered from start data 236 through pre-processing at a server 232. The start data 236 may include any information such as graphics primitives, object models, background images, etc. The rendered image (or video stream) 238 may be transmitted by the server 232 to a display device 234 over one or more networks 202. A received image (or video stream) 240 may be post-processed at the display device 234 and presented as displayed image 242.

Some examples of image quality improvement at the display device 234 may include attempts to reduce blur and improve motion smoothness. In-set signal processing may impact a number of display characteristics such as improving perceived motion smoothness or decreasing a quality provided by anti-aliasing in the original signal, which presents a different set of optimal rendering conditions than unprocessed video. Another example may include frame-to-frame background sharpening, which may reduce an amount of detail needed in each frame for the background in order to present the user with the same image.

Some television post-processing technologies employ new image frame calculation and image sharpening. The post-processing circuitry in the television set may generate new image frames (images that are never delivered as input to the television) by estimating object extents and movement between frames and making new frames with objects between these locations and estimated background fill. The new frame generation may generate up to about 92% of frames. Edge sharpening may be performed using masks and candidates among images, and can use multiple frames of data to sharpen background elements by removing blur.

In some scenarios, such post-processing may defeat the complicated motion blur and anti-aliasing processes of rendering (which are aimed at creating more realistic images). The post-processing may also add to the fake appearance of image portions (e.g., game characters) by restoring artificially sharp boundaries and motion.

According to some examples, various approaches may be used to determine a type of display device being used. For example, newer generation televisions have web browsers or web applets, in which case the equipment type is reported in a network request. Alternatively, the source (service or content provider) may query the display device or a controller employing the display device, for example using DLNA standards, or a display device type or model may be reported to the source and post-processing characteristics looked up at a database of display devices.

Once the display type is detected, the information may be abstracted into a characterization of the processing such that the properties of the post-processing that will be applied can be determined. In some examples, an impact register may be used as an alphanumeric string that matches a render path characterization and includes information on how to modify rendering for a particular display device.

Figure 3:
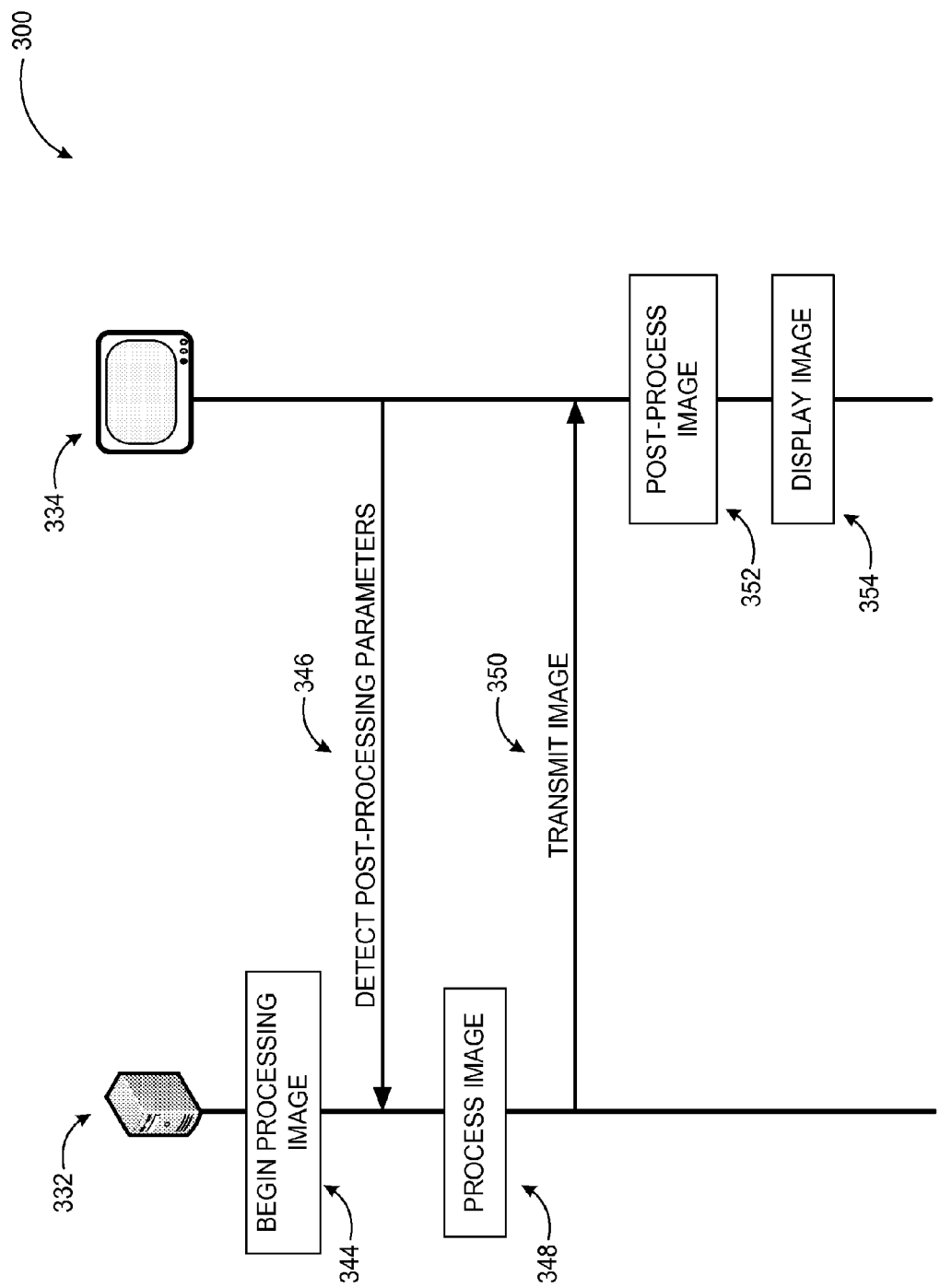
FIG. 3 illustrates one example action flow in matching graphics rendering for displays.

FIG. 3 illustrates one example action flow in matching graphics rendering for displays, arranged in accordance with at least some embodiments described herein.

Typical rendering in a modern gaming system may be comprised of a number of steps such as composition and animation, vertex shading, geometry shading, primitive setup, rasterization, pixel shading, and/or frame buffer blending. An impact register for such a render path may thus have seven different entries, indicating the post-processing type and severity for each of the render steps.

Several of the steps above may be highly impacted by typical existing television post-processing. For example, the frame buffer blending step may be directly opposed to the sharpening performed by a television set. If the impact register indicates for the frame buffer blending step a high level of sharpening on the destination display, the render pipeline may skip that step altogether to arrive at the same final display with less overall computation. In another example, the impact register may indicate for vertex shading and geometry shading steps to change a shading model to provide other visual effects that compensate for the loss of motion blur to reduce undesirable fake qualities. This may also be accomplished with an unsharpening mask.

Likewise, a display device that performs simulated object movement may be flagged in the impact register for composition and animation steps as it may be possible to eliminate entire frames of rendering (the number of frames per second delivered via non-traditional interfaces can be variable). Thus, the composition and animation step can be significantly modified by reducing the number of frames that are needed and/or by clearly edge-defining moving objects so that they are optimally movement smoothed. This may simplify rendering computation and result in greater perceived quality in the displayed images or video streams.

Referring to the example action flow in a diagram 300 of FIG. 3, a server 332 may begin processing an image or video stream from raw data (344). Next, the server 332 may detect post-processing parameters (346) of a display device 334 as discussed above. The server 332 may employ an impact register or similar mechanism to determine how pre-processing parameters at the server 332 are to be modified, and process the image or video stream (348) based on the modified pre-processing parameters. The processed image or video stream may then be transmitted (350) to the display device 334.

At the display device 334, the received image may be processed further based on the display device's post-processing parameters (352) and displayed (354) resulting in increased quality of displayed video images and/or reduced computing burden at the server 332.

Figure 4:
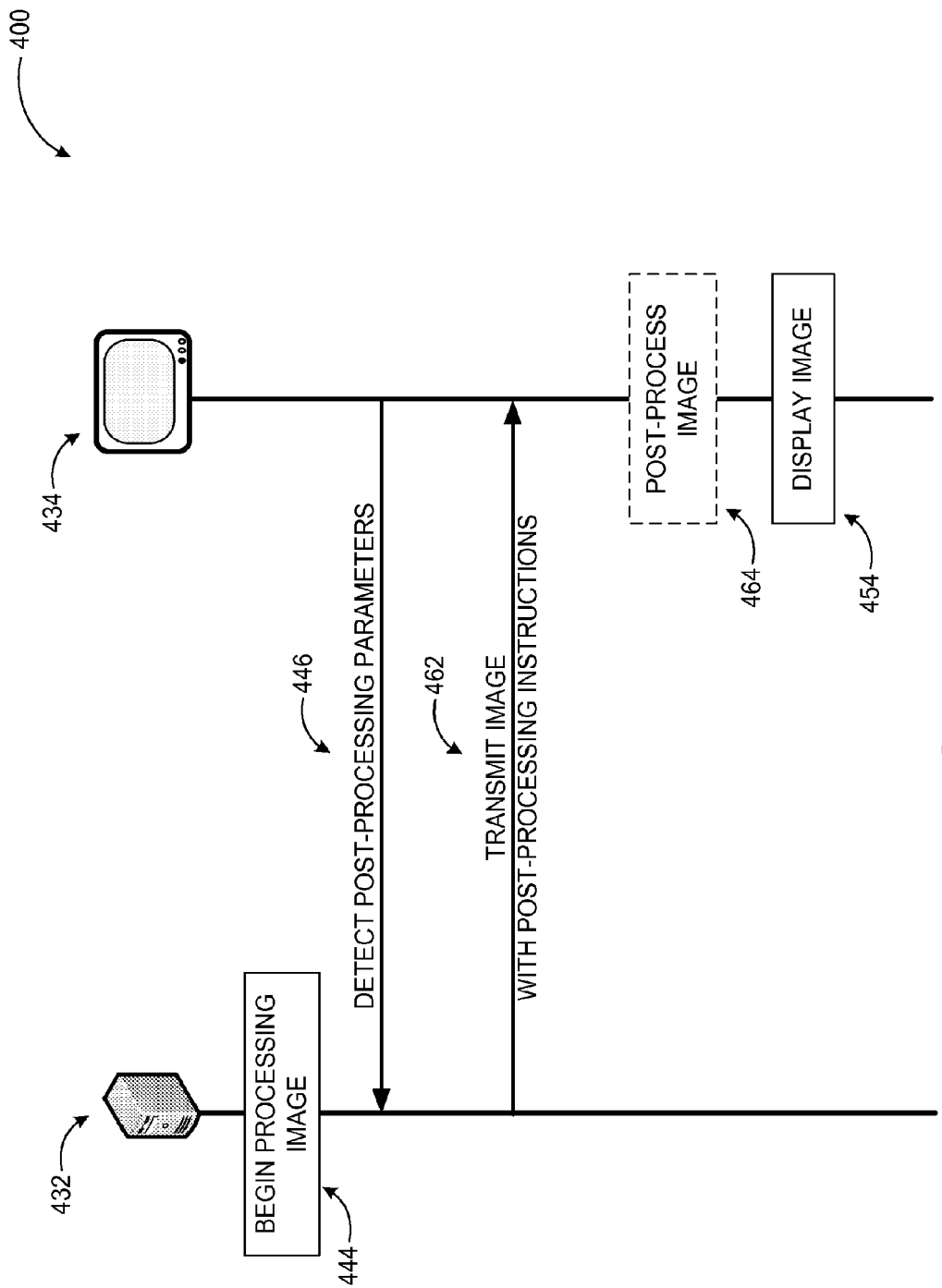
FIG. 4 illustrates another example action flow in matching graphics rendering for displays.

FIG. 4 illustrates another example action flow in matching graphics rendering for displays, arranged in accordance with at least some embodiments described herein.

In some examples, the video signal may include a "do not post-process" flag that may turn off some or all of the display device post-processing. The flag may be delivery options to an in-display browser, a DLNA message, or an emulator command to invoke emulation of another screen type in a display browser or applet. For displays with built in applications, the flag may invoke a particular application to deliver the video too. In addition, the system may just send a "do not post-process" flag by default if a type of display equipment is unknown or not detected. Furthermore, the adjustment of pre- or post-processing parameters may be repeated based on changing conditions. For example, a player may switch display devices while playing a game. Upon detecting the new display device and its post-processing parameters, a system according to some embodiments may adjust the pre-processing parameters accordingly and/or instruct the new display device to adjust its post-processing parameters.

As shown in a diagram 400 in FIG. 4, a server 432 may begin processing an image or video stream from raw data (444) according to another example scenario. The server 432 may next determine post-processing parameters (446) of a display device 434 by querying the display device 434, receiving the information from the user or display device 434, or looking up a database for the display device 434.

Upon determining which pre- or post-processing parameters need to be modified for optimum display, the image or video stream may be transmitted with post-processing instructions (462) to the display device 434. The instructions may cause the display device 434 to turn off post-processing completely or post-process the image or video stream with modified parameters (464). The display device 434 may then display the image or video stream (454).

Figure 5:
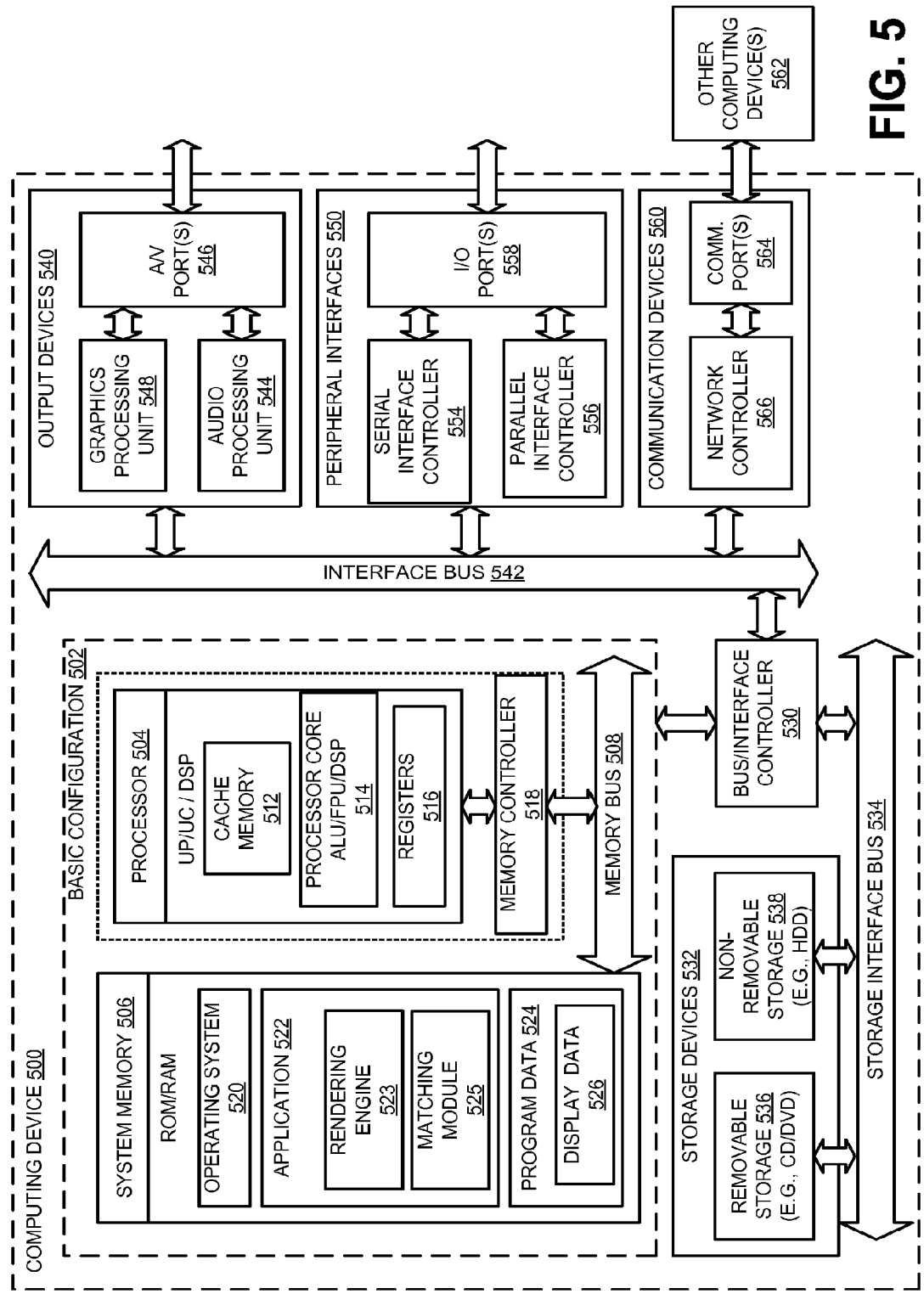
FIG. 5 a general purpose computing device, which may be used to implement a system for matching graphics rendering for displays.

FIG. 5 illustrates a general purpose computing device 500, which may be used to implement a system for matching graphics rendering for displays, arranged in accordance with at least some embodiments described herein. For example, computing device 500 may be used as server 432 of FIG. 4. In an example basic configuration 502, the computing device 500 may include one or more processors 504 and a system memory 506. A memory bus 508 may be used for communicating between the processor 504 and the system memory 506. The basic configuration 502 is illustrated in FIG. 5 by those components within the inner dashed line.

Depending on the desired configuration, the processor 504 may be of any type, including but not limited to a microprocessor (µP), a microcontroller (µC), a digital signal processor (DSP), or any combination thereof. The processor 504 may include one more levels of caching, such as a level cache memory 512, a processor core 514, and registers 516. The example processor core 514 may include an arithmetic logic unit (ALU), a floating point unit (FPU), a digital signal processing core (DSP Core), or any combination thereof. An example memory controller 518 may also be used with the processor 504, or in some implementations the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, one or more applications 522, and program data 524. The applications 522 may be game applications, tele-chat applications, tele-shopping applications, or similar ones, and include a rendering engine 523, which may preprocess and render images or video streams for transmission to display devices. Applications 522 may also include a matching module 525, which may determine display device post-processing parameters and adjust the rendering pre-processing parameters based on the detected post-processing parameters as described herein. The program data 524 may include, among other data, display data 526, or the like, as described herein.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 542 for facilitating communication from various interface devices (e.g., one or more output devices 540, one or more peripheral interfaces 550, and one or more communication devices 560) to the basic configuration 502 via the bus/interface controller 530. Some of the example output devices 540 include a graphics processing unit 548 and an audio processing unit 544, which may be configured to communicate to various external devices such as a display or speakers via one or more A/V ports 546. One or more example peripheral interfaces 550 may include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 560 includes a network controller 566, which may be arranged to facilitate communications with one or more other computing devices 562 over a network communication link via one or more communication ports 564.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a part of a general purpose or specialized server, mainframe, or similar computer that includes any of the above functions. The computing device 500 may also be implemented as a personal computer including both laptop computer and non-laptop computer configurations.

Example embodiments may also include methods for matching graphics rendering for displays. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other examples, the human interaction can be automated such as by pre-selected criteria that may be machine automated.

Figure 6:
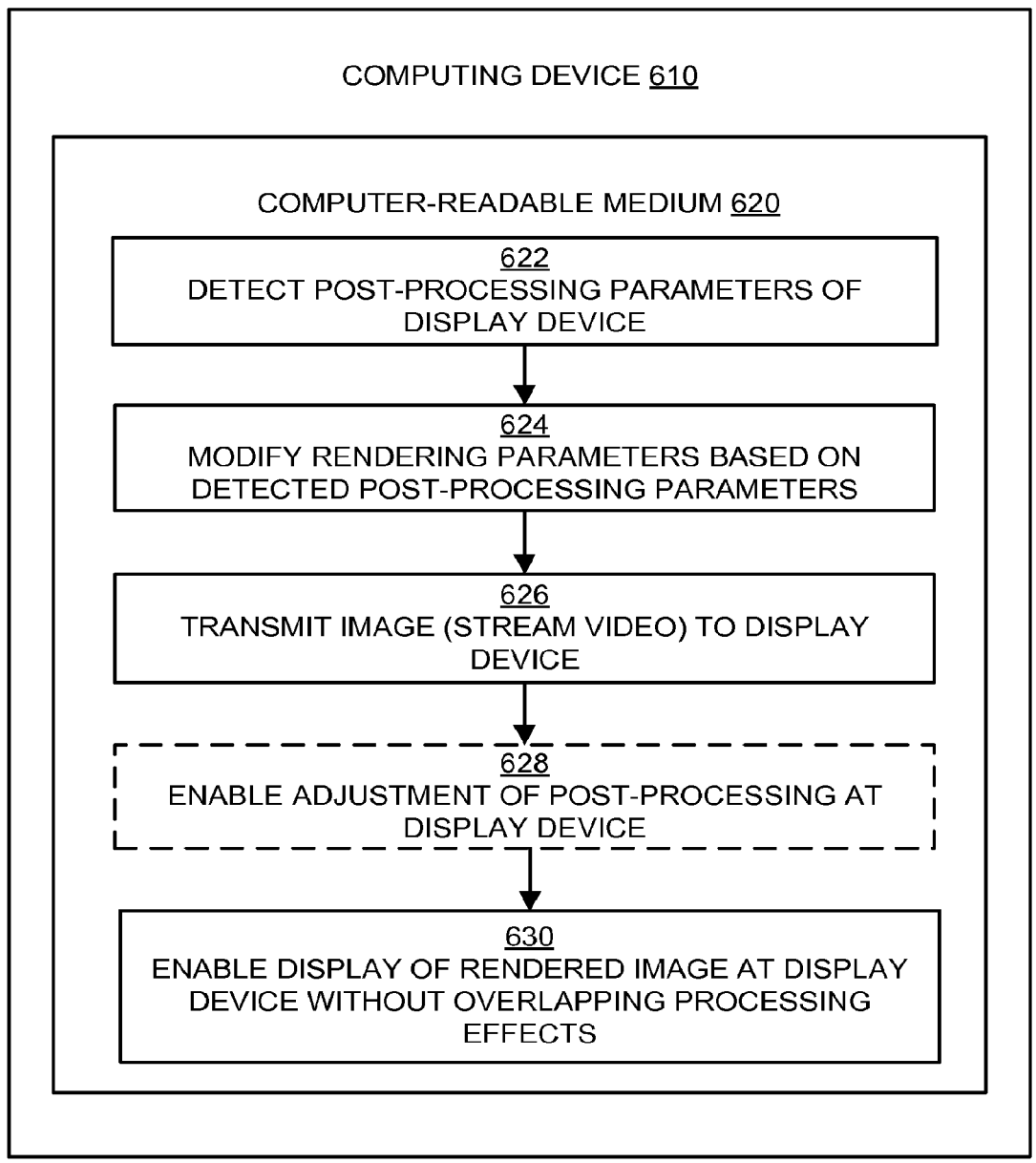
FIG. 6 is a flow diagram illustrating an example method for matching graphics rendering for displays.

FIG. 6 is a flow diagram illustrating an example method for matching graphics rendering for displays that may be performed by a computing device such as the device 500 in FIG. 5 or the server 432 in FIG. 4, arranged in accordance with at least some embodiments described herein. Example methods may include one or more operations, functions or actions as illustrated by one or more of blocks 622, 624, 626, 628, and/or 630. The operations described in the blocks 622 through 630 may also be stored as computer-executable instructions in a computer-readable medium such as a computer-readable medium 620 of a computing device 610.

An example process graphics render matching to display devices may begin with block 622, "DETECT POST-PROCESSING PARAMETERS OF DISPLAY DEVICE", where a display device such as display device 434 of FIG. 4 may be detected and post-processing parameters of the display device determined by the server 432 of FIG. 4. Block 622 may be followed by block 624, "MODIFY RENDERING PARAMETERS BASED ON DETECTED POST-PROCESSING PARAMETERS," where one or more pre-processing or rendering steps at the server 432 of FIG. 4 may be adjusted or removed such that a quality of displayed image at the display device 434 is not degraded. For example, if a rendering step is to be undone by a post-processing step at the display device, that step may be removed at the server 432.

Block 624 may be followed by block 626, "TRANSMIT IMAGE (VIDEO STREAM) TO DISPLAY DEVICE". At block 626, the server 432 may transmit the image (or vide stream) to the display device or a client device controlling the display device for displaying. Block 626 may be followed by optional block 628, "ENABLE ADJUSTMENT OF POST-PROCESSING AT DISPLAY DEVICE", where the server 432 may instruct the display device to adjust a post-processing parameter or turn of a post-processing step that may undo a rendering operation. Block 628 may be followed by block 630, "ENABLE DISPLAY OF RENDERED IMAGE AT DISPLAY DEVICE WITHOUT OVERLAPPING PROCESSING EFFECTS," where the image is displayed at the display device such that overlapping processes are eliminated and pre- and post-processing operations that may counteract are adjusted.

The blocks included in the above described process are for illustration purposes. Matching graphics rendering for displays may be implemented by similar processes with fewer or additional blocks, for example, employing block depicted in FIG. 1 and FIG. 4. In some examples, the blocks may be performed in a different order. In some other examples, various blocks may be eliminated. In still other examples, various blocks may be divided into additional blocks, or combined together into fewer blocks.

Figure 7:
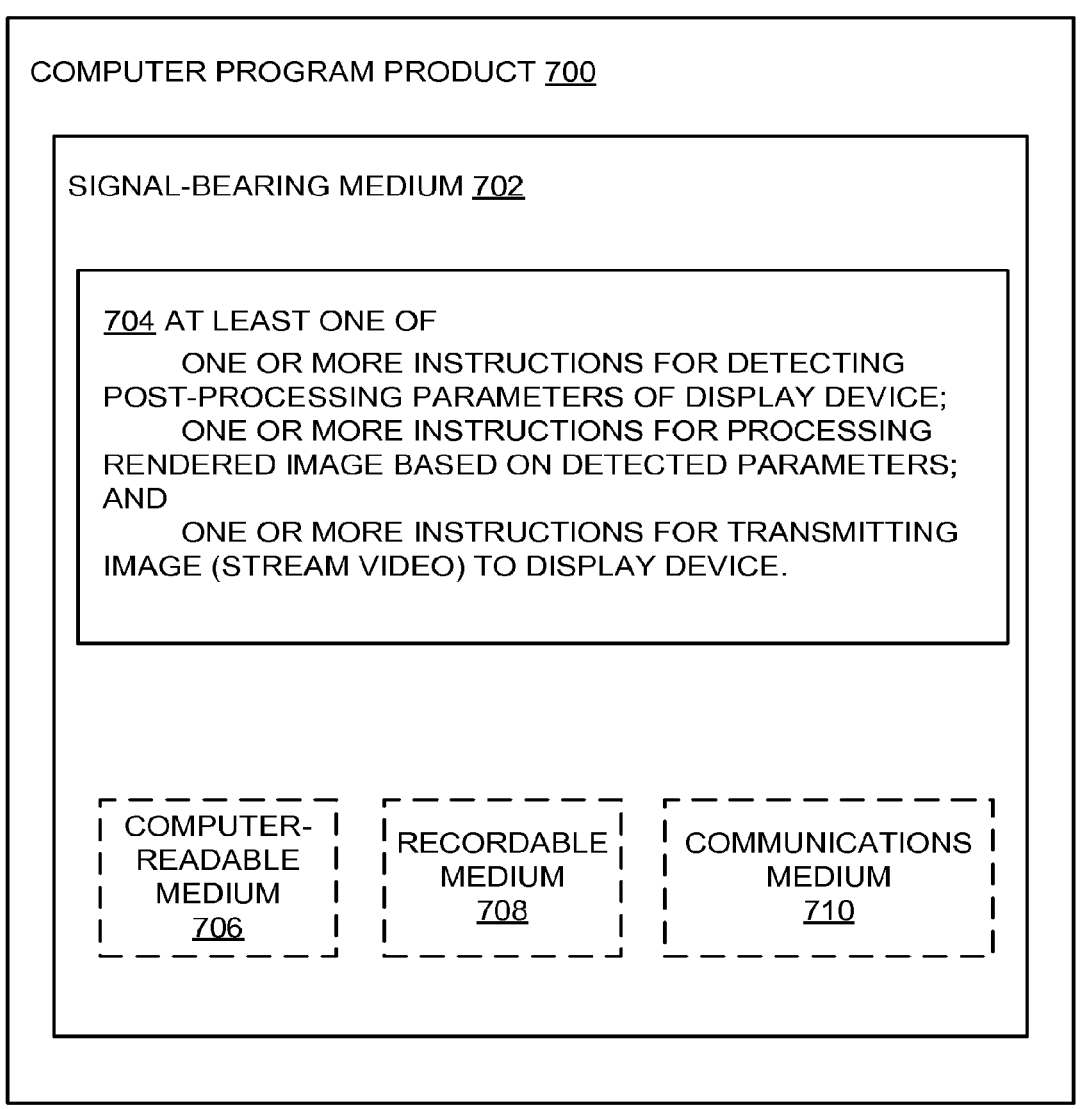
FIG. 7 illustrates a block diagram of an example computer program product, all arranged in accordance with at least some embodiments described herein.

FIG. 7 illustrates a block diagram of an example computer program product 700, arranged in accordance with at least some embodiments described herein. In some examples, as shown in FIG. 7, the computer program product 700 may include a signal bearing medium 702 that may also include one or more machine readable instructions 704 that, when executed by, for example, a processor, may provide the functionality described herein. Thus, for example, referring to the processor 504 in FIG. 5, the matching module 525 or rendering engine 523 may undertake one or more of the tasks shown in FIG. 7 in response to the instructions 704 conveyed to the processor 504 by the medium 702 to perform actions associated with providing graphics render matching for displays as described herein. Some of those instructions may include, for example, instructions for detecting post-processing parameters of a display device, processing rendered image based on detected parameters, and transmitting the image or video stream to the display device, according to some embodiments described herein.

In some implementations, the signal bearing medium 702 depicted in FIG. 7 may encompass a computer-readable medium 706, such as, but not limited to, a hard disk drive, a solid state drive, a Compact Disc (CD), a Digital Versatile Disk (DVD), a digital tape, memory, etc. In some implementations, the signal bearing medium 702 may encompass a recordable medium 708, such as, but not limited to, memory, read/write (R/W) CDs, R/W DVDs, etc. In some implementations, the signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, the program product 700 may be conveyed to one or more modules of the processor 704 by an RF signal bearing medium, where the signal bearing medium 702 is conveyed by the wireless communications medium 710 (e.g., a wireless communications medium conforming with the IEEE 802.11 standard).

According to some examples, a method for providing graphics render matching for displays may include detecting one or more post-processing parameters of a display device, modifying a rendering process at a server based on the detected post-processing parameters, transmitting one or more images generated by the modified rendering process to the display device, and enabling display of the transmitted one or more images at the display device such that an impact of post-processing at the display device resulting in decreased image quality is substantially reduced.

According to other examples, the one or more post-processing parameters may be detected by one or more of: detecting a display device type, receiving the display type over a network request from a client device controlling the display device, or querying the client device controlling the display device. Detecting the one or more post-processing parameters may further include employing a look-up table or computing the one or more post-processing parameters based on the display type. The images may include a series of still images or a video stream. The rendering process may be modified by adjusting one or more of: a number of transmitted frames per second, a motion smoothing parameter, or an anti-aliasing parameter.

According to further examples, the rendering process may be modified by determining a new render path characterization that includes one or more of composition and animation, vertex shading, geometry shading, primitive setup, rasterization, pixel shading, and/or frame buffer blending. The method may also include creating an impact register that includes a post-processing type and a severity level for each of the render path steps, employing a combination of one or more of the render path steps to reduce the impact of post-processing, transmitting an instruction to the display device to turn off one or more post-processing steps at the display device, monitoring the post-processing parameters throughout a transmission of a game, and/or updating the rendering process in response to a change in the post-processing parameters. The change in the post-processing parameters may include a change of a display device type. The display device may be a television set, a projector, a mobile device display, a wearable display, or a headset display.

According to other examples, a server adapted to match graphics rendering for displays may include a memory adapted to store instructions, a communication module, and a processing unit for communication with game client devices via one or more networks in conjunction with the stored instructions. The processing unit may detect one or more post-processing parameters of a display device, modify a rendering process based on the detected post-processing parameters to eliminate one or more rendering process steps that will be reversed by post-processing at the display device, transmit one or more images generated by the modified rendering process to the display device, and enable display of the transmitted one or more images at the display device.

According to yet other examples, the processing unit may detect the one or more post-processing parameters by detecting a display device type, receiving the display type over a network request from a client device controlling the display device, and/or querying the client device controlling the display device. The processing unit may further detect the one or more post-processing parameters by one or more of employing a look-up table and computing the one or more post-processing parameters based on the display type.

According to some examples, the one or more images may include a series of still images or a video stream, and the processing unit may modify the rendering process by adjusting one or more of: a number of transmitted frames per second, a motion smoothing parameter, a blurring parameter, and an anti-aliasing parameter; modify the rendering process by determining a new render path characterization that includes one or more steps comprising: composition and animation, vertex shading, geometry shading, primitive setup, rasterization, pixel shading, and/or frame buffer blending; and create an impact register that includes a post-processing type and a severity level for each of the render path steps.

According to other examples, the processing unit may employ a combination of one or more of the render path steps to reduce the impact of post-processing, transmit an instruction to the display device to turn off one or more post-processing steps at the display device, monitor the post-processing parameters throughout a transmission of a display stream, and/or update the rendering process in response to a change in the post-processing parameters. The change in the post-processing parameters may include a change of a display device type. The display device may be a television set, a projector, a mobile device display, a wearable display, or a headset display.

According to further examples, a computer-readable medium may include instructions stored thereon for providing graphics render matching to display post-processing. The instructions may include detecting one or more post-processing parameters of a display device, modifying a rendering process at a game server based on the detected post-processing parameters, transmitting one or more images generated by the modified rendering process to the display device, and enabling display of the transmitted one or more images at the display device such that an impact of post-processing at the display device resulting in decreased image quality is substantially reduced.

According to yet further examples, detecting the one or more post-processing parameters may include detecting a display device type, receiving the display type over a network request from a client device controlling the display device, and querying the client device controlling the display device. Detecting the one or more post-processing parameters may further include one or employing a look-up table and computing the one or more post-processing parameters based on the display type.

According to some examples, the one or more images may include a series of still images or a video stream, and modifying the rendering process may include one or more of: adjusting a number of transmitted frames per second, a motion smoothing parameter, and an anti-aliasing parameter. Modifying the rendering process may also include determining a new render path characterization that includes composition and animation, vertex shading, geometry shading, primitive setup, rasterization, pixel shading, and/or frame buffer blending.

According to other examples, the instructions may further include creating an impact register that includes a post-processing type and a severity level for each of the render path steps, employing a combination of one or more of the render path steps to reduce the impact of post-processing, transmitting an instruction to the display device to turn off one or more post-processing steps at the display device, monitoring the post-processing parameters throughout a transmission of a game, and/or updating the rendering process in response to a change in the post-processing parameters. The change in the post-processing parameters may include a change of a display device type, and the display device may be a television set, a projector, a mobile device display, a wearable display, or a headset display.

According to yet other examples, a game client adapted to accept graphics render matching to display post-processing may include a display device, a memory adapted to store instructions, a communication module, and a processor coupled to the memory, the communication module, and the display device. The processor may determine one or more post-processing parameters of the display device, provide the one or more post-processing parameters to a game server such that a rendering process at the game server is modified based on the determined post-processing parameters, receive one or more images generated by the modified rendering process from the game server, and enable display of the received one or more images at the display device such that an impact of post-processing at the display device resulting in decreased image quality is substantially reduced.

According to some examples, the processor may provide the one or more post-processing parameters by transmitting a network message upon initial connection to the game server and/or responding to a query from the game server. The one or more images may include a series of still images or a video stream. The processor may also receive an instruction from the game server to turn off one or more post-processing steps at the display device and cause the one or more post-processing steps at the display device to be turned off. The one or more post-processing steps at the display device may include a motion smoothing parameter and/or an anti-aliasing parameter. The processor may further monitor the post-processing parameters throughout an execution of a game and provide updates to the game server in response to a change in the post-processing parameters. The change in the post-processing parameters may include a change of a display device type or a transition in display mode. The display device may be a television set, a projector, a mobile device display, a wearable display, or a headset display.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, a solid state drive, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors for moving and/or adjusting components and/or quantities).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to provide graphics render matching for displays, comprising:
   detecting one or more post-processing parameters of a display device;
   modifying a rendering process at a server based on the detected post-processing parameters such that counteracting pre-processing operations and post-processing operations are adjusted by one or more of:
      eliminating one or more operations of the rendering process,
      reducing a number of frames needed for image generation, and
      edge defining moving objects;
   transmitting one or more images generated by the modified rendering process to the display device;
   transmitting an instruction to the display device to turn off one or more post-processing operations at the display device in order to prevent decreased image quality at the display device; and
   enabling display of the transmitted one or more images at the display device such that an impact of post-processing at the display device resulting in the decreased image quality is substantially reduced.

2. The method according to claim 1, wherein detecting the one or more post-processing parameters comprises one or more of:
   detecting a display device type;
   receiving the display device type over a network request from a client device controlling the display device; and
   querying the client device controlling the display device.

3. The method according to claim 2, wherein detecting the one or more post-processing parameters further comprises one or more of employing a look-up table and computing the one or more post-processing parameters based on the display type.

4. The method according to claim 1, wherein the one or more images include one of a series of still images and a video stream.

5. The method according to claim 4, wherein modifying the rendering process includes adjusting one or more of: a number of transmitted frames per second, a motion smoothing parameter, and an anti-aliasing parameter.

6. The method according to claim 1, wherein modifying the rendering process includes determining a new render path characterization that includes one or more operations comprising: composition and animation, vertex shading, geometry shading, primitive setup, rasterization, pixel shading, and/or frame buffer blending.

7. A server adapted to match graphics rendering for displays, comprising:
   a memory adapted to store instructions;
   a communication module; and
   a processing unit for communication with game client devices via one or more networks in conjunction with the stored instructions, wherein the processing unit is configured to:
      detect one or more post-processing parameters of a display device;
      modify a rendering process based on the detected post-processing parameters to eliminate one or more rendering process operations that will be reversed by post-processing at the display device, wherein an impact register is created to match a render path characterization, and provide information on how to modify the rendering process based on a type of the display device;
      transmit one or more images generated by the modified rendering process to the display device; and
      enable display of the transmitted one or more images at the display device.

8. The server according to claim 7, wherein the impact register includes a post-processing type and a severity level for each render path operation.

9. The server according to claim 7, wherein the processing unit is further configured to employ a combination of one or more of render path operations to reduce the impact of post-processing.

10. The server according to claim 7, wherein the processing unit is further configured to:
    monitor the post-processing parameters throughout a transmission of a game; and
    update the rendering process in response to a change in the post-processing parameters.

11. The server according to claim 10, wherein the change in the post-processing parameters includes a change of a display device type.

12. The server according to claim 7, wherein the display device is one of a television set, a projector, a mobile device display, a wearable display, and a headset display.

13. A computer-readable medium with instructions stored thereon to provide graphics render matching to display post-processing, the instructions comprising:
    detecting one or more post-processing parameters of a display device;

modifying a rendering process at a game server based on the detected post-processing parameters such that counteracting pre-processing operations and post-processing operations are adjusted;

transmitting one or more images generated by the modified rendering process to the display device;

transmitting an instruction to the display device to turn off one or more post-processing operations at the display device in order to prevent decreased image quality at the display device, wherein the instruction includes a "do not post-process" flag delivered as an in-display browser, a Digital Living Network Alliance (DLNA) message, or an emulator command to invoke emulation of another screen type in a display browser or applet;

transmitting the instruction to the display device by default if a type of the display device is unknown or not detected; and enabling display of the transmitted one or more images at the display device such that an impact of post-processing at the display device resulting in the decreased image quality is substantially reduced.

14. The computer-readable medium according to claim 13, wherein modifying the rendering process includes one or more of: adjusting a motion smoothing parameter and an anti-aliasing parameter, and determining a new render path characterization that includes one or more operations comprising: composition and animation, vertex shading, geometry shading, primitive setup, rasterization, pixel shading, and/or frame buffer blending.

15. The computer-readable medium according to claim 13, wherein the instructions further comprise:

monitoring the post-processing parameters throughout a transmission of a game; and updating the rendering process in response to a change in the post-processing parameters.

16. A game client adapted to accept graphics render matching to display post-processing, the game client comprising:

a display device;

a memory adapted to store instructions;

a communication module; and a processor coupled to the memory, the communication module, and the display device, wherein the processor is configured to:

determine one or more post-processing parameters of the display device;

provide the one or more post-processing parameters to a game server such that a rendering process at the game server is modified based on the determined post-processing parameters such that counteracting pre-processing operations and post-processing operations are adjusted, wherein an impact register is created to match a render path characterization, and provide information on how to modify the rendering process based on a type of the display device;

receive one or more images generated by the modified rendering process from the game server;

receive an instruction from the game server to turn off one or more post-processing operations at the display device in order to prevent decreased image quality at the display device;

receive the instruction from the game server by default if a type of the display device is unknown or not detected; and enable display of the received one or more images at the display device such that an impact of post-processing at the display device resulting in the decreased image quality is substantially reduced.

17. The game client according to claim 16, wherein the processor is further configured to provide the one or more post-processing parameters by:

transmitting a network message upon initial connection to the game server; and/or responding to a query from the game server.

18. The game client according to claim 16, wherein the processor is further configured to:

monitor the post-processing parameters throughout an execution of a game; and provide updates to the game server in response to a change in the post-processing parameters.

19. The game client according to claim 18, wherein the change in the post-processing parameters includes a change of a display device type.

20. The game client according to claim 16, wherein the display device is one of a television set, a projector, a mobile device display, a wearable display, and a headset display.

* * * * *